United States Patent [19]

Skantar et al.

[11] Patent Number: 4,904,027
[45] Date of Patent: Feb. 27, 1990

[54] DIGITAL AIR BRAKE CONTROL SYSTEM

[75] Inventors: Elmer T. Skantar, East Pittsburgh; Walter J. Sanders, Jeannette, both of Pa.

[73] Assignee: American Standard Inc., Wilmerding, Pa.

[21] Appl. No.: 252,941

[22] Filed: Oct. 3, 1988

[51] Int. Cl.⁴ .................. B60T 15/14; B60T 13/68; B60T 15/58
[52] U.S. Cl. ....................... 303/15; 303/20; 303/61; 303/DIG. 3
[58] Field of Search .............. 303/3, 11, 15, 16, 17, 303/20, 50, 59, 61, 101, DIG. 3; 364/426.01; 246/167 R, 182 R; 188/151 R

[56] References Cited

U.S. PATENT DOCUMENTS

| | | | |
|---|---|---|---|
| 3,398,993 | 8/1968 | Sarbach et al. | 303/20 |
| 3,560,057 | 2/1971 | Worbois . | |
| 3,653,723 | 4/1972 | Worbois . | |
| 3,814,484 | 6/1974 | Matthews et al. | 303/20 |
| 3,901,558 | 8/1975 | Burkett . | |
| 4,013,323 | 3/1977 | Burkett | 303/20 |
| 4,239,292 | 12/1980 | Nagase | 303/15 |
| 4,253,480 | 3/1981 | Kessel et al. . | |
| 4,370,714 | 1/1983 | Rettich et al. | 303/20 X |
| 4,538,228 | 8/1985 | Brearey et al. | 303/15 X |
| 4,553,723 | 11/1985 | Nichols et al. . | |
| 4,582,280 | 4/1986 | Nichols et al. . | |
| 4,678,241 | 7/1987 | Tamamori et al. | 303/33 |
| 4,801,105 | 2/1989 | Weiss et al. | 303/DIG. 3 |

FOREIGN PATENT DOCUMENTS

| | | | |
|---|---|---|---|
| 1221262 | 7/1966 | Fed. Rep. of Germany | 303/15 |
| 0926885 | 5/1963 | United Kingdom | 303/15 |

Primary Examiner—Andres Kashnikow
Assistant Examiner—Timothy Newholm
Attorney, Agent, or Firm—J. B. Sotak

[57] ABSTRACT

A pneumatic pressure control arrangement for controlling the brakes of railway vehicles. A manual brake command controller converts a selected brake position into a corresponding electrical signal. An application magnet valve is connectable to a source of air pressure and to a storage device. A release magnet valve is connectable to atmosphere and to the storage device. An electropneumatic transducer senses the pressure in the storage device and provides a feedback signal. A microprocessor receives and compares the electrical signal with the feedback signal to develop an error signal which initially energizes the application magnet valve and the release magnet valve upon request of braking effort, and which subsequently pulses the application magnet valve when the pressure in the storage device is within a preselected control range, and which finally deenergizes the application magnet valve when the pressure in the storage device is within a preselected deadband range to cause a lap condition.

18 Claims, 3 Drawing Sheets

DIGITAL AIR BRAKE CONTROL SYSTEM

FIELD OF THE INVENTION

This invention relates to a digital pressure control arrangement for an air brake control system and, more particularly, to an air brake control system for railway vehicles employing a microprocessor for pulse width modulating an application magnet valve and a release magnet valve to establish the pressure in an equalizing reservoir and, in turn, in the brake line in accordance with the brake demand request.

BACKGROUND OF THE INVENTION

Previously, "26" type of locomotive brake equipment provided a wide range of functions depending upon the needs and desires of the individual railroad customer. Any new locomotive brake equipment must retain most, if not all of these functions, and it is recognized that only a microprocessor based equipment would have the flexibility to provide economically both the present as well as the new features and functions that the railroads will want. In addition, the new equipment which may employ one or more microprocessors must be combined with other electronic, electrical and electropneumatic components to provide new and novel computer control of train brake pipe and locomotive brake cylinder pressure. Further, there exists the need for performing some new functions utilizing the memory storage, computation, and timing capabilities of the computer, as well as performing the usual real-time control functions of the old "26" equipment.

OBJECTS AND SUMMARY OF THE INVENTION

Accordingly, it is an object of this invention to provide a new and improved digital air brake control system for railway vehicles.

Another object of this invention is to provide a unique pneumatic brake control arrangement employing a microprocessor for controlling the brakes on railway vehicles.

A further object of this invention is to provide a pneumatic pressure control arrangement for controlling the brakes of railway vehicles having a manual brake command controller for converting a selected brake position into a corresponding electrical signal, an application magnet valve connectable to a source of air pressure and to a storage device, a release magnet valve connectable to atmosphere and to the storage device, an electropneumatic transducer for sensing the pressure in the storage device and providing a feedback signal, a microprocessor receiving and comparing the electrical signal with the feedback signal to develop an error signal which initially energizes the application magnet valve and the release magnet valve upon request of braking effort and which subsequently pulses the magnet valves when the pressure in the storage device comes within a preselected control range and which finally deactivates the magnet valves when the pressure in the storage device comes within a preselected deadband range to cause a lap condition.

In accordance with the present invention, there is provided a digital air brake control system for railway vehicles comprising, means for initiating a desired brake demand signal, means responsive to the desired brake demand signal for providing timing and control signals, means conditioned by the timing and control signals for controlling the pressure of the brake line by monitoring the pressure in an equalizing reservoir, means for sensing the pressure in the equalizing reservoir and for providing a feedback signal to the timing and control means for calculating the difference between the desired brake demand signal and the feedback signal to produce an error signal which causes the pressure controlling means to be pulsed ON and OFF until the pressure in the equalizing reservoir substantially coincides with that of the desired brake demand signal.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
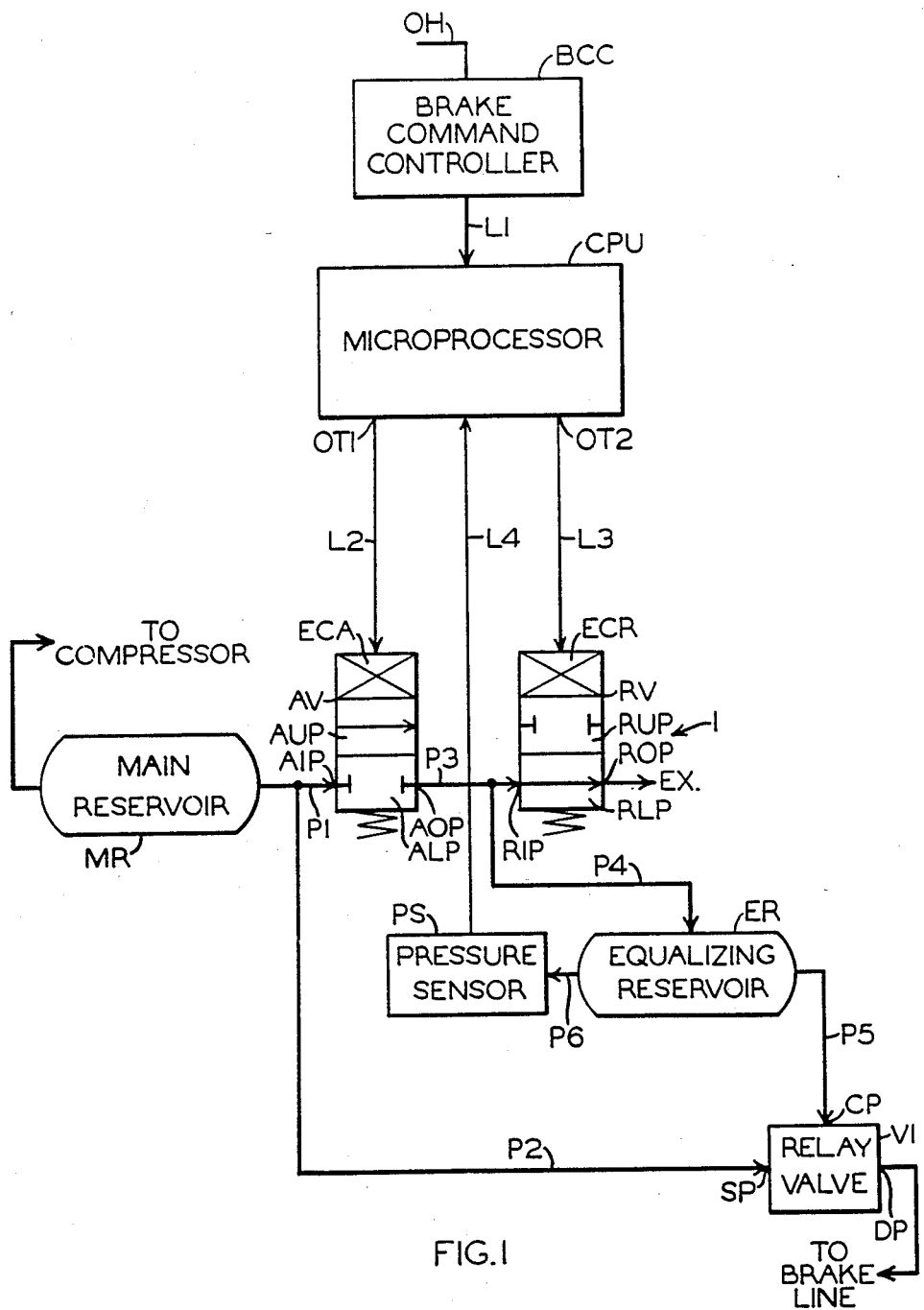
FIG. 1 is a partial diagrammatic illustration of an air brake system for railway vehicles in accordance with the present invention.

Referring now to the drawings, and in particular to FIG. there is shown a portion of the air brake control system for a railway vehicle or locomotive, generally characterized by numeral 1. As shown, a brake command controller BCC having an operating handle OH is within easy reach of the train operator or engineer. The handle OH is manually rotated to one of a plurality of selected positions to initiate the desired degree of braking or brake demand request. The mechanical position of the handle is converted into an electrical signal by a suitable encoder, or the like. Many of the control functions require the operator to take some deliberate action, which may be conveniently facilitated through the use of a keypad or keyboard for data entry and a display with operator prompting to assure completeness of source information and system readiness prior to movement. With nonvolatile memory or EPROMS, some of these inputs could be permanently stored, eliminating the need for repeated data entry. The display devices available include CRTs, electroluminescent, gas plasma, vacuum fluorescent or LCD displays. At least with respect to the brake functions, set up of the locomotive and train would be concentrated at a single point in the cab of the lead car or locomotive. The highly desirable qualities of the brake valves would be retained as the primary means of controlling locomotive and train brakes for most applications. Other types of operators such as toggles, joysticks and pushbuttons could be used in place of the rotary handle controller OH, if preferred, and in cases where the cab arrangement will permit. Another interesting possibility, with the available keypad, is manual programming of the brake pipe reduction for a particular location and have the computer control the slowdown or stop. Beyond that is the whole gamut of possibilities with automatic train operation (ATO). An immediate concern, however, is that the traditional concept of control be retained until it can be proven and confirmed that something better exists.

The output signal of the encoder is conveyed to the input of a programmable microprocessor or digital computer unit CPU via lead L1. A timer in the microprocessor CPU is started and after the expiration of a given period of time, and the main program of the microprocessor CPU is activated to carry out the braking operation. The microprocessor CPU may be a low power CMOS central processing unit which may be an NSC800, manufactured and marketed by National Semiconductor Corporation of Santa Clara, California. The central processing unit is an 8-bit CMOS microprocessor having interrupt control, flag flip-flop, automatic logic unit, instruction register, instruction decoder and machine cycle encoding, timing and control register array, address buffer and data/address buffer. The microprocessor CPU includes an internal clock generator which is driven by an external crystal having a frequency which is twice the operating frequency of the CPU. Thus, the microprocessor CPU provides the capability of performing a random number of functions by utilizing the memory storage, computation and timing features in addition to executing the normal real-time control functions.

As shown in FIG. 1, a pair of outputs are derived from the microprocessor CPU. A first output terminal OT1 of the microprocessor CPU is connected to the electrical coil ECA of an electropneumatic or electromagnetic spring-biased application magnet valve AV via a lead L2. A second output terminal OT2 of the microprocessor CPU is connected to the electrical coil ECR of an electropneumatic or electromagnetic spring-biased release magnet valve RV via a lead L3. The application solenoid magnet valve AV and the release solenoid magnet valve RV each include an upper valve portion and a lower valve portion which are spring-biased to a position as shown in FI. 1. When the application magnet valve AV is deenergized, the spring causes the blocking off of the flow path by the lower valve portion ALP while when the application magnet valve AV is energized, a flow path is established by the upper valve portion AUP. Conversely, when the release magnet valve RV is deenergized, the spring causes a flow path to be established by the lower valve portion RLP while when the release magnet valve RV is energized, the flow path is blocked off by the upper valve portion RUP.

It will be seen that a main reservoir MR is pneumatically connected to the input port AIP of the application magnet valve AV via a conduit or pipe P1. The air pressure in the main reservoir MR is maintained at a desired psi level by a suitable air compressor (not shown). It will be noted that the output of the main reservoir MR is also connected by conduit or pipe P2 to the supply port SP of a relay valve V1 which will be described hereinafter. As shown, the output port AOP of the application magnet valve AV is connected to the input port RIP of the release magnet valve RV via conduit or pipe P3. The release magnet valve RV includes an output port ROP which is exhausted to atmosphere EX. The pipe P3 is also connected to the input of a storage device or equalizing reservoir ER via pipe P4.

The output of the equalizing reservoir ER is connected to the control port CP of the relay valve VI via pipe P5 and is also connected to a pressure transducer or sensor PS via pipe P6. It has been found to be advantageous to locate and connect the pressure sensor PS as close as possible to the storage volume of the control device in order to sense the pressure being monitored as soon as possible so that fast response is achieved and minimum delay is attained. The pressure sensor PS may be an electropneumatic strain-gage transducer which converts the pneumatic pressure into a proportional electrical signal. The electrical signal is conveyed to the microprocessor CPU via electrical lead L4. The relay valve VI includes a delivery port DP which, in turn, is connected to the brake pipe or brake line.

Figure 3:
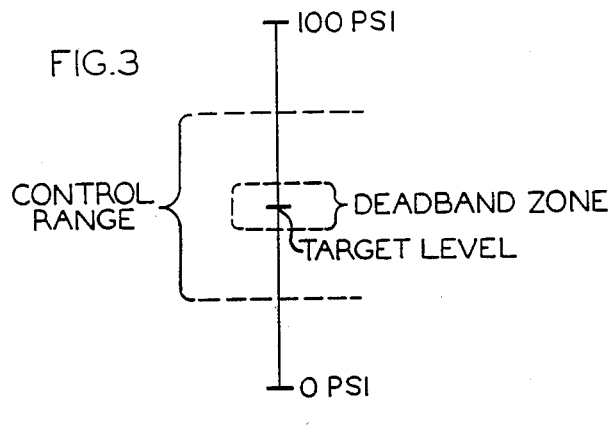
FIG. 3 is a graphic illustration of the pressure response of the air brake system of FIG. 1.
Figure 5:
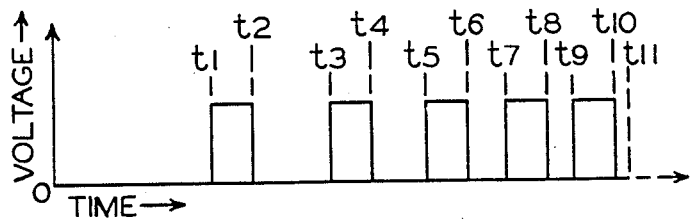
FIG. 5 is a group of electrical pulses showing another operating condition for the system of FIG. 1.

Let us now assume that the operator of the train initiates a certain brake demand or command request by moving the operating handle OH to the desired position which establishes a target level which may lie between zero (0) psi and a hundred (100) psi as shown in FIG. 3. It will be appreciated that the equalizing reservoir ER is normally at 100 psi since it is charged from the main reservoir MR via the upper portion AUP of application magnet valve AV. Now, let us assume that a braking demand is requested. In response to the movement of the handle OH, an electrical control signal corresponding to the brake demand position is conveyed via lead L1 to the input of the microprocessor CPU which is suitably programmed to initate the appropriate control commands. The main program causes the deenergization of the electrical coil ECR and deenergization of the electrical coil ECA so that the application and release magnet valves AV and do not shift positions. That is, there are no magnetic forces to overcome the forces of the biasing springs so that the flow path is blocked off by the lower portion ALP of application magnet valve AV and the flow path to atmosphere EX is established by the lower portion RLP of the release magnet valve RV. Thus, a fluid circuit is established from the equalizing reservoir, through pipes P3 and P4, through the open release magnet valve RV, and to the atmosphere EX. Accordingly, pressure starts to decrease in the equalizing reservoir ER. That is, the air pressure in the equalizing reservoir ER drops from a hundred (100) psi toward a desired pressure level and the pressure sensor PS conveys an electrical feedback signal over lead L4 to the microprocessor CPU which is proportional to the air pressure in the equalizing reservoir ER. Now, when the pressure reaches the upper level of a control pressure range, as shown in FIG. 3, the main program of the microprocessor CPU causes the energization of release magnet valve RV at time t1 as shown in FIG. 5. The timing circuits in the programmed microprocessor CPU cause the deenergization of the release magnet valve RV at time t2 for a predetermined period of time so that at time t3 the release magnet valve RV is again energized. Now, at time t4, the release magnet valve RV is again deenergized but for a shorter period of time from t4 to t5 to cause the pressure to continue to decrease within the control range depicted in FIG. 3. At time t6, the release magnet valve RV is again deenergized until time t7, which is a shorter period than from time t4 to t5. The release magnet valve RV is again deenergized from time t8 to time t9. Finally, the release magnet valve RV is deenergized for a very short duration from time t10 to time t11. This last deenergization of the release magnet valve RV brings the pressure within a deadband range as shown in FIG. 3. In order to prevent overshooting and to avoid hunting, the microprocessor CPU energizes the release magnet valve RV so that the fluid path to atmosphere EX is blocked off and the application magnet valve AV is blocked off from the main reservoir MR and a lap condition is established. In some cases, the last narrow pulse of the pulse width modulation train will cause the pressure to coincide with the target pressure level; however, any pressure within the deadband range provides satisfactory operation. The lap condition will be maintained so long as the operating handle OH remains in the same braking position. If a leak occurs in the piping, the valves or the control volume, the pressure drops out of the deadband range. The drop in pressure, for example, in the equalizing reservoir ER, is sensed by the pressure transducer PS which conveys an electrical feedback signal to the microprocessor CPU which again causes the application magnet valve AV to be pulsed for an appropriate duration to bring the pressure to within the deadband range. It will be appreciated that continuous leakage will result in repeated pulsing of the application magnet valve AV to maintain the pressure within the deadband range. It is advisable to locate and repair the leakage as soon as possible in order to prevent the repeated recycling of the valve and to reduce wear thereof.

Figure 6:
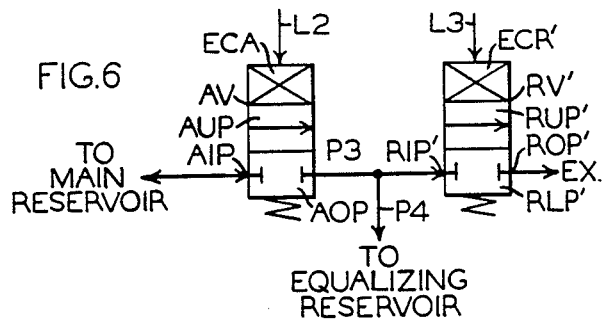
FIG. 6 is a partial schematic diagram of an alternate embodiment of the application and release magnet valves.

Let us now assume that the pressure in the equalizing reservoir ER is below the desired target pressure level and is outside of the lower level of the control range as shown in FIG. 3. Under this condition, the main program of the microprocessor CPU energizes the application magnet valve AV as well as energizes the release magnet valve RV. Accordingly, the associated biasing spring shifts the release magnet valve RV to its upper position RUP to block off communication between the atmosphere EX and the equalizing reservoir ER. At the same time, the associated electromagnetic coil shifts the application magnet valve AV to its upper portion AUP so that the equalizing reservoir ER is connected to the main reservoir MR via pipe P1, ports AIP and AOP, through pipes P3 and P4, to the equalizing reservoir ER. As shown in FIG. 6, when the pressure reaches the lower level of the control range, application magnet valve AV is energized at time t1 and remains energized until time t2. The release magnet valve RV remains deenergized until time t3, at which time the release magnet valve RV is again energized until time t4. Again the release magnet valve RV remains deenergized from time t4 to time t5. It will be seen that the release magnet valve RV is successively turned ON and OFF until it is finally turned OFF at time t10, at which time the pressure in the equalizing reservoir ER will be within the deadband range and preferably a the target level as shown in FIG. 3.

As shown in FIG. 6, the application and release magnet valves may be identical in construction in which the upper and lower portions are the same. Again, the first output terminal OT1 of the microprocessor CPU is connected to the electrical coil ECA of the electropneumatic or electromagnetic spring-biased application magnet valve AV via a lead L2. The second output terminal OT2 of the microprocessor CPU is connected to the electrical coil ECR' of the electropneumatic or electromagnetic spring-biased release magnet valve RV' via a lead L3. As noted above, application solenoid magnet valve AV and the release solenoid magnet valve RV' each include an upper free flow valve portion and a lower blocking valve portion which are spring-biased to a position as shown in FIG. 6. Again, when the application magnet valve AV is deenergized, the spring causes the blocking off of the flow path by the lower valve portion ALP while when the application magnet valve AV is energized, a flow path is established by the upper valve portion AUP. Likewise, when the release magnet valve RV' is energized, a flow path is established by the upper valve portion RUP, while when the release magnet valve RV' is deenergized, the flow path is blocked off by the lower valve portion RLP'. It will be appreciated that the input port RIP' is connected to conduits or pipes P3 and P4 and the output port ROP, is connected to exhaust. Further, it will be understood that both the application and release magnet valves AV and RV, are turned ON and OFF in accordance with the pulses shown in FIG. 4 during an increase in a brake demand request and a decrease in a brake demand request It will be seen from the flow chart of FIG. 2 that a subroutine is interrupt driven by expiration of a programmable timer in the microprocessor CPU for effectively controlling the electromagnetic solenoid valve. While only one example is shown in the flow chart of FIG. 2, it is understood that any number of magnet valves can be controlled simply by appropriately setting up or programming an associated timer. While the algorithm and flow chart is self-explanatory as far as the control of the magnet valves is concerned, what happens after the timers are set and the magnet valves are energized or deenergized requires some explanation. At the point in the chart where the timers are set and started, there is a direct return to the main body of the program. At that time, the timers are running and will eventually expire and cause another interrupt different from the interrupt that caused entry into the control routine. When this interrupt occurs, the associated vector will contain the address of a subroutine that will put its associated magnet valve pair into a lap state or some state compatible with the control method. The magnet valves will remain in this state until the main program is interrupted by the expiration of the main timer and the cycle is repeated.

The hardware for controlling the air pressure consists of two small magnet valves affecting the control pressure of an air relay valve VI, such as an S-type relay valve, a C2-W relay valve or a J-relay valve. After considerable testing, it was concluded that an effective control scheme could be implemented by keeping the control volumes as small as possible and using magnets as small as possible to change the level of control pressure. By using small volumes and control devices, the temperature effects occurring during the charging and exhausting of the pneumatic system are kept to a minimum. This is due to the relatively large mass of the relay type of control devices as compared to the mass of air in the small control volumes. Once the control pressure is established, the delivery side of the relay valve compensates for any change in system brake pipe pressure due to changes in temperature. Additionally, the relay valve will try to maintain the pressure of the system at a level dictated by the control pressure, thus compensating for leakage into or out of the system.

Figure 2:
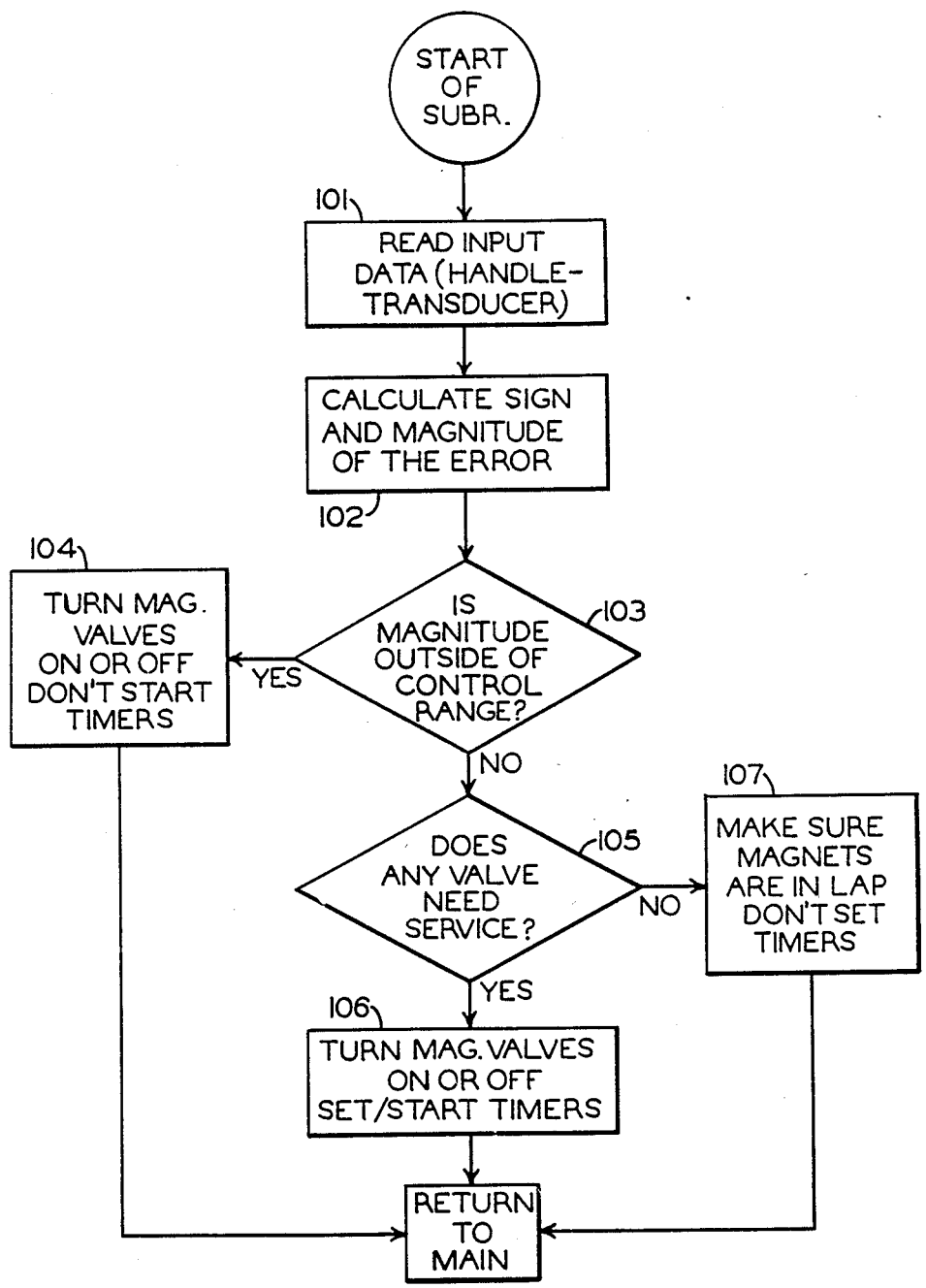
FIG. 2 is a flow chart which explains the operation of the air brake system of FIG. 1 and which the microprocessor executed in the present invention.

The main program for controlling air pressure in various control devices used in a railroad air brake system, in general, is shown in the flow chart of FIG. 2. The process was devised primarily to be used in conjunction with a microprocessor based control system that monitors all the necessary parameters at regular intervals and produces a digital signal capable of controlling the magnet valves in such a manner so that a stable control pressure is established at a specific relay valve and, consequently, a substantially steady pressure is maintained in the system.

Referring now to the operation which is depicted in the flow chart and specifically to the first functional block 101, the start of the subroutine is initiated and entry is made to the first functional block 101 after the expiration of a given period of time which is established by a timer in the main program. The first functional block 101 senses and reads the condition of the input devices which consists of collecting or gathering the necessary data from the reference brake handle and the feedback pressure transducer and storing the information in appropriate memory locations for subsequent use by the main program.

From the parameters collected by the first functional block 101, a second functional block 102 calculates and determines the sign and magnitude of the pressure error by subtracting the pressure reading of the transducer from the brake handle pressure demand or request.

In a following decision making block 103, the magnitude of the pressure error is checked against a preselected pressure control range. If the magnitude of the pressure error is outside of the pressure control range, then the decision making block 103 outputs a "yes" to the following functional block 104 which places the magnet valves in the appropriate state according to the sign of the pressure error. Thus, the pulse width timers are not started, and a return to the main program is made. When the pressure error is outside of the control range, the magnet valves will be left ON or OFF as dictated by the sign of the pressure error until the system pressure is within the predetermined control range.

Figure 4:
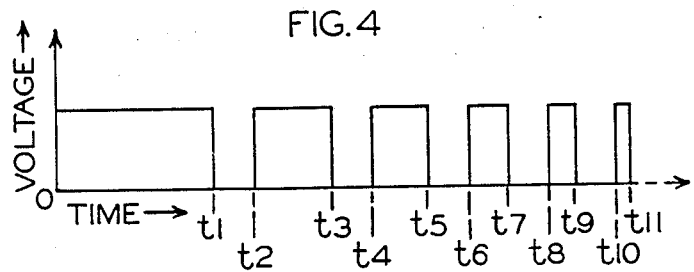
FIG. 4 is a group of electrical pulses showing one operating condition for the system illustrated in FIG. 1.

It will be appreciated that the control range is determined by the operating characteristics of the particular system, and typically it may be between 1 or 2 psi from the target pressure level as shown in FIG. 3. If the magnitude is within the pressure control range, the decision making block 103 outputs a "no" to the next decision making block 105. At this time, the pressure of the system is within the control pressure range so that the magnet valves will be in is pulse controlled for precise periods of time, as shown in FIG. 4, so as to cause repeated smaller changes in the pressure. During this controlled pressure sequence, the particular state that the respective magnet valves will be in is determined by the sign of the pressure error, and the period of time the respective electromagnet is activated will be calculated from the magnitude of the pressure error. If the pressure error is out of the deadband, service is needed and entry is made into the third functional block 106 from the "yes" output of the decision making block 105. This particular functional block 1106 turns the magnet valves ON or OFF as dictated by the sign of the pressure error, and the timers are started and set for a period determined by the magnitude of the pressure error. After that, a return to the main program occurs.

If the control pressure is within the control range and near enough to the target pressure level, then no service is required and the decision making block 105 outputs a "no" to the fourth functional block 107. The fourth functional block 107 causes the magnet valves to be placed into a lap state, if they are not already there. However, the timers are not set and a return to the main program is made.

As noted above, the flow chart of FIG. 2 is substantially self-explanatory as far as the control of the magnet valves is concerned, but the operation after the timers are set and the magnet valves are energized or deenergized requires some explanation. When the timers are set and started, there is a direct return to the main portion of the computer program. At that time, the timers are running and will eventually expire and cause another interrupt which is different from the interrupt that is caused by the entry into the control routine. When this interrupt occurs, the associated vector will contain the address of a subroutine that will cause the magnet valves to be placed into a lap state, or some state compatible with the control method. The magnet valves will remain in this lap state until the main program is interrupted by the expiration of the main timer and the cycle is repeated.

In addition to the basic control program, a concept has been implemented to some degree which incorporates the idea of making the system "adaptable" to some of its environment. In brief, there have been circumstances where the pulse width and the timing are just right so that no change in the control pressure occurs. Such a condition could cause the electromagnet to pulse continuously until the control pressure is changed enough to cause the control system to select a different pulse width.

This idea is accomplished by establishing a counter that would increment once for each time the pulse width and sign of the error remained the same as the previous pulse width and error. When the counter reaches a predetermined count, the next pulse width is selected, the counter is reset to zero, and the sequence is repeated.

If the pressure varies enough to change the sign of the pressure error as a result of the most recent pulse width, then a flag is set indicating that the stability has been achieved and further references to pulse width will begin at the pulse width where the stability is started.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents, and substitutions for components of the above specifically described embodiment of the invention may be made by those skilled in the art without departing from the spirit and scope of the invention as set forth in the appended claims.

We claim:

1. A digital air brake control system for railway vehicles comprising, means for initiating a desired brake demand signal, means responsive to the desired brake demand signal for providing timing and control signals, means including a pair of magnet valves conditioned by the timing and control signals for controlling the pressure of the brake line by monitoring the pressure in an equalizing reservoir, means for sensing the pressure in the equalizing reservoir and for providing a feedback signal to the timing and control means for calculating the difference between the desired brake command signal and the feedback signal to produce an error signal which causes the magnet valves of the pressure controlling means to be concurrently moved to opposite positions and then concurrently pulses the magnet valves in opposite positions with one of the magnet valves being decreasingly pulsed ON and alternately pulsed OFF .

until the pressure in the equalizing reservoir substantially coincides with that of the desired brake demand signal.

2. The digital air brake control system, as defined in claim 1, wherein the initiating means is a manual brake command controller.

3. The digital air brake control system, as defined in claim 2, wherein the manual brake command controller converts the selected position into a corresponding electrical signal.

4. The digital air brake control system as defined in claim 1, wherein the timing and control means is a microprocessor.

5. The digital air brake control system, as defined in claim 1, wherein the magnet valves are electropneumatic valves.

6. The digital air brake control system, as defined in claim 5, wherein one of two electropneumatic valves is an application magnet valve.

7. The digital air brake control system, as defined in claim 6, wherein another of the two electropneumatic valves is a release magnet valve.

8. The digital air brake control system, as defined in claim 7, wherein the release magnet valve includes an upper blocking portion and a lower free flow portion.

9. The digital air brake control system, as defined in claim 7, wherein the release magnet valve includes an upper free flow portion and a lower blocking portion.

10. The digital air brake control system, as defined in claim 6, wherein the application magnet valve includes an upper free flow portion and a lower blocking portion.

11. The digital air brake control system, as defined in claim 5, wherein each of the two electropneumatic valves takes the form of a two-way solenoid valve.

12. The digital air brake control system, as defined in claim 5, wherein each of the two electropneumatic valves takes the form of a spring-biased solenoid valve.

13. The digital air brake control system, as defined in claim 1, wherein the sensing means is a pneumatic to electrical transducer.

14. A pneumatic pressure control arrangement for controlling the brakes of railway vehicles comprising, a manual brake command controller for converting a selected brake position into a corresponding electrical signal, an application magnet valve connectable to a source of air pressure and to a storage device, a release magnet valve connectable to atmosphere and to the storage device, an electropneumatic transducer for sensing the pressure in the storage device and providing a feedback signal, a microprocessor means for receiving and comparing the electrical signal with the feedback signal to develop an error signal which initially causes the application magnet valve and the release magnet valve to be concurrently moved to opposite positions upon request of braking effort and which subsequently concurrently pulses the magnet valves in opposite positions in a decreasing manner when the pressure in the storage device comes within a preselected control range and which finally deactivates the magnet valves when the pressure in the storage device comes within a preselected deadband range to cause a lap condition.

15. The pneumatic pressure control arrangement, as defined in claim 14, wherein the application magnet valve is pulsed by electrical pulses which have a decreasing duration.

16. The pneumatic pressure control arrangement, as defined in claim 14, wherein the electropneumatic transducer takes the form of a strain gage device.

17. The pneumatic pressure control arrangement, as defined in claim 14, wherein the storage device includes an equalizing reservoir.

18. The pneumatic pressure control arrangement, as defined in claim 14, wherein the error signal causes the initial deenergization of the application magnet valve and the release magnet valve upon a decreasing braking request, and which subsequently pulses the release magnet valve when the pressure in the storage device comes within the preselected control range, and which finally deenergizes the release magnet valve when the pressure in the storage device comes within the preselected deadband range to cause a lap condition.

* * * * *

UNITED STATES PATENT AND TRADEMARK OFFICE
CERTIFICATE OF CORRECTION

PATENT NO. : 4,904,027
DATED : February 27, 1990
INVENTOR(S) : Elmer T. Skantar and Walter J. Sanders It is certified that error appears in the above-identified patent and that said Letters Patent is hereby corrected as shown below:

Column 2, line 23, delete "executed" and insert --executes-- line 36, after "FIG." insert --1--

Column 3, line 43, delete "FI." and insert --FIG.--

Column 4, line 6, after "device" insert --or-- line 33, after "and" insert --RV-- line 46, delete "over" and insert --via--

Column 5, line 41, delete "6" and insert --4-- line 42, before "application" insert --the-- line 43, delete "energized", first and second occurrence, and insert --deenergized-- line 44, delete "release" and insert --application-- same line, delete "RV" and insert --AV-- line 45, delete "deenergized" and insert --energized-- same line, delete "release" and insert --application-- line 46, delete "RV" and insert --AV--

UNITED STATES PATENT AND TRADEMARK OFFICE
CERTIFICATE OF CORRECTION

PATENT NO. : 4,904,027
DATED : February 27, 1990
INVENTOR(S) : Elmer T. Skantar and Walter J. Sanders It is certified that error appears in the above-identified patent and that said Letters Patent is hereby corrected as shown below:

Column 5, line 47, delete "release" and insert --application-- same line, delete "RV" and insert --AV-- same line, delete "deenergized" and insert --energized-- line 48, delete "release" and insert --application-- line 49, delete "RV" and insert --AV-- line 52, delete "a" and insert --at--

Column 6, line 7, delete "RUP," and insert --RUP'-- line 11, delete "ROP," and insert --ROP'-- line 14, delete "RV," and insert --RV'-- line 17, after "quest" insert --.--

Column 7, line 43, delete "in is"

UNITED STATES PATENT AND TRADEMARK OFFICE
CERTIFICATE OF CORRECTION

PATENT NO. : 4,904,027

DATED : February 27, 1990

INVENTOR(S) : Elmer T. Skantar and Walter J. Sanders

It is certified that error appears in the above-identified patent and that said Letters Patent is hereby corrected as shown below:

Column 8, line 62, delete "command" and insert --demand--

Signed and Sealed this

Fifth Day of March, 1991

Attest:

HARRY F. MANBECK, JR.

Attesting Officer

Commissioner of Patents and Trademarks